(12) United States Patent
Prothery et al.

(10) Patent No.: US 11,993,157 B2
(45) Date of Patent: May 28, 2024

(54) ELECTRICALLY POWERED COMMERCIAL VEHICLE HAVING A BATTERY STRUCTURE

(71) Applicant: Volvo Truck Corporation, Gothenburg (SE)

(72) Inventors: Patrick Prothery, Poule les Echarmeaux (FR); Didier Bouchut, Chassieu (FR)

(73) Assignee: Volvo Truck Corporation, Gothenburg (SE)

( * ) Notice: Subject to any disclaimer, the term of this patent is extended or adjusted under 35 U.S.C. 154(b) by 400 days.

(21) Appl. No.: 17/426,422

(22) PCT Filed: Feb. 4, 2019

(86) PCT No.: PCT/EP2019/052651
§ 371 (c)(1),
(2) Date: Jul. 28, 2021

(87) PCT Pub. No.: WO2020/160747
PCT Pub. Date: Aug. 13, 2020

(65) Prior Publication Data
US 2022/0097537 A1    Mar. 31, 2022

(51) Int. Cl.
*B60L 50/60*    (2019.01)
*B60K 1/04*    (2019.01)
(Continued)

(52) U.S. Cl.
CPC ............ *B60L 50/66* (2019.02); *B60K 1/04* (2013.01); *B60L 3/0007* (2013.01); *B60L 50/64* (2019.02);
(Continued)

(58) Field of Classification Search
CPC ....................... B60L 50/66; B60L 2200/36
See application file for complete search history.

(56) References Cited

U.S. PATENT DOCUMENTS 8,002,063 B2 *  8/2011  Rydberg ................. B60R 16/04
                                                180/68.5
10,493,837 B1 * 12/2019  Angelo ................... B60L 50/66
(Continued)

FOREIGN PATENT DOCUMENTS

CN       1659076 A     8/2005
CN     101052559 A    10/2007
(Continued)

OTHER PUBLICATIONS

International Search Report and Written Opinion for International Patent Application No. PCT/EP2019/052651, dated Sep. 16, 2019, 10 pages.
(Continued)

*Primary Examiner* — Erez Gurari
(74) *Attorney, Agent, or Firm* — Withrow & Terranova, PLLC

(57) ABSTRACT

Commercial vehicle comprising a chassis adjoining a cab along a longitudinal direction (X), the commercial vehicle being at least partly electrically powered, wherein the commercial vehicle has at least one battery structure (30) rigidly attached to the chassis to accommodate a battery, the battery structure (30) comprising first (31) and second (32) brackets extending in a transverse direction (Y) at a distance from each other along the longitudinal direction (X), wherein the battery structure (30) comprises at least one resiliently deformable arrangement (50) through which the battery (21) is mounted on the first bracket (31), and at least one fixation arrangement (60) through which the battery (21) is rigidly mounted on the second bracket (32).

13 Claims, 6 Drawing Sheets

(51) Int. Cl.
*B60L 3/00* (2019.01)
*B60L 50/64* (2019.01)
*H01M 50/209* (2021.01)
*H01M 50/242* (2021.01)
*H01M 50/249* (2021.01)

(52) U.S. Cl.
CPC ....... *H01M 50/209* (2021.01); *H01M 50/242* (2021.01); *H01M 50/249* (2021.01); *B60K 2001/0438* (2013.01); *B60L 2200/36* (2013.01)

(56) References Cited

U.S. PATENT DOCUMENTS

| | | | | |
|---|---|---|---|---|
| 11,124,076 | B1* | 9/2021 | Borghi | B62D 21/02 |
| 2009/0000843 | A1* | 1/2009 | Burchett | B60R 16/04 |
| | | | | 180/68.5 |
| 2009/0166116 | A1* | 7/2009 | Kiya | H01M 50/209 |
| | | | | 180/68.5 |
| 2013/0075173 | A1* | 3/2013 | Kato | H01M 50/249 |
| | | | | 180/68.5 |
| 2021/0351470 | A1* | 11/2021 | Uemura | H01M 50/276 |
| 2021/0380001 | A1* | 12/2021 | Hörder | B60L 50/64 |
| 2022/0089039 | A1* | 3/2022 | Sassi | B60K 1/04 |
| 2022/0097537 | A1* | 3/2022 | Prothery | H01M 50/209 |
| 2022/0161680 | A1* | 5/2022 | Landvik | B60L 50/64 |
| 2022/0190414 | A1* | 6/2022 | An | H01M 50/20 |
| 2022/0281306 | A1* | 9/2022 | Landvik | B62D 21/04 |

FOREIGN PATENT DOCUMENTS

| | | |
|---|---|---|
| CN | 103009979 A | 4/2013 |
| CN | 103079858 A | 5/2013 |
| CN | 103153764 A | 6/2013 |
| CN | 103282225 A | 9/2013 |
| CN | 107848581 A | 3/2018 |
| CN | 108357565 A | 8/2018 |
| DE | 102016113759 A1 | 4/2017 |
| WO | 2005084985 A1 | 9/2005 |
| WO | 2007045365 A1 | 4/2007 |
| WO | 2007078284 A2 | 7/2007 |

OTHER PUBLICATIONS

First Office Action for Chinese Patent Application No. 201980089465.X, dated Jun. 30, 2023, 18 pages.

* cited by examiner

ELECTRICALLY POWERED COMMERCIAL VEHICLE HAVING A BATTERY STRUCTURE

This application is a 35 USC 371 national phase filing of International Application No. PCT/EP2019/052651, filed Feb. 4, 2019, the disclosure of which is incorporated herein by reference in its entirety.

TECHNICAL FIELD

The invention relates to an electrically powered commercial vehicle having a battery structure.

BACKGROUND ART

Commercial vehicles that are partly or totally electrically powered, such as hybrid, plug-in hybrid or full electric commercial vehicles, use one or several batteries of large dimensions, possibly up to 2 m long or more along an extension direction between opposite first and second end walls.

The batteries are accommodated in one or several battery structures rigidly attached to a chassis of the vehicle adjoining a cab along a longitudinal direction. More specifically, the battery structure comprises first and second brackets extending in a transverse direction at a distance from each other along the longitudinal direction. Each battery is mounted on the first and second brackets so as to extend horizontally, namely with the extension direction of the battery parallel to the longitudinal direction of the vehicle.

An issue with such arrangement is a flexibility of the chassis. In particular, the chassis undergoes torsion which causes the first and second brackets to rotate along with the chassis about the longitudinal direction. For example, the chassis can typically undergo torsion of up to 1° to 1.5° per meter along a centerline, during operation. When installing the battery alongside the chassis, it will undergo the deformation due to this torsion of the chassis. With a battery mounted rigid to the chassis, the deformation can be in the order of magnitude of 30 mm to 50 mm between the first and second end walls of the battery.

Solutions exist to address this issue:
the battery may be rigidly mounted on the chassis and composed of battery packs able to move relative to each other to undergo high deformation, as implemented for example by PVI on the Maxity and Midlum trucks,
the battery may be mounted vertically on the chassis, for instance behind the cab to shorten a distance between attachments to the chassis, thereby reducing deformations, as implemented for example by PVI on the C-less,
the battery may be mounted on the chassis with straps that allow a slight rotation of the battery, as implemented for example by Mitsubishi Fuso on the Canter Eco-Hybrid,
the battery may be suspended by a material allowing for very high deformation such as an elastomer, as implemented for example in document WO 2007/045365.

However, the above solutions do not provide suitable protection of the battery in case of accident, such as frontal crash (deceleration in the longitudinal direction), side collision (acceleration in the transverse direction) or roll-over (acceleration and deceleration in longitudinal and transverse directions as well as vertical direction).

SUMMARY OF THE DISCLOSURE

The invention aims at solving the aforementioned problem.

To that end, the invention proposes a commercial vehicle comprising a cab with a driving place for a driver, and a chassis adjoining the cab along a longitudinal direction, the commercial vehicle being at least partly electrically powered and comprising an electrically powered engine and at least one battery to supply the electrically powered engine with electrical energy,
wherein the vehicle has at least one battery structure rigidly attached to the chassis to accommodate the battery, the battery structure comprising first and second brackets extending in a transverse direction at a distance from each other along the longitudinal direction,
wherein the battery structure comprises at least one resiliently deformable arrangement through which the battery is mounted on the first bracket, and at least one fixation arrangement through which the battery is rigidly mounted on the second bracket.

Hence, with the invention, the battery is rigidly fixed to the chassis on one side while being movably mounted on the other side thanks to the resiliently deformable arrangement acting as filtering system. The battery structure enabling the battery to float on the resiliently deformable arrangement at one unique side provides a torsion decoupling effect between the chassis and the battery while ensuring sufficient stiffness and strength to withstand strains in case of crash.

The resiliently deformable arrangement may comprise a blade that is resiliently deformable and extends in the transverse direction, the blade having a center portion fixed to the first bracket, and opposite free ends on which the battery is mounted.

The blade may be conformed so that the free ends of the blade extend in an horizontal end plane that is offset with respect to a horizontal central plane including the center portion. Such configuration provides compactness and increases flexibility of the blade for a given strength.

The horizontal end plane may be offset towards a ground surface on which the commercial vehicle rests with respect to the horizontal central plane.

The battery may have a parallelepiped shape presenting two opposite first and second end walls spaced apart from each other in the longitudinal direction, each of the first and second end walls presenting two lower corners spaced apart from each other in the transverse direction, and the lower corners of the first end wall may be mounted on the free ends of the blade, and the lower corners of the second end wall may be mounted on the second bracket.

The battery structure presents three rigid mounting points, namely one rigid point on the first bracket for the center portion of the blade and two rigid points on the second bracket for the battery, thereby providing a three-point decoupling system. Meanwhile, the blade is designed to absorb part of the torsion by undergoing flexion along a blade axis extending in the transverse direction. This enables a partial but sufficient decoupling between the chassis and the battery. In particular, in case of frontal crash, the battery is not only held in a rigid way by two corners of the second end wall, but also by the blade and by contact points with the brackets mounted to the chassis. In case of lateral collision, the three-point decoupling system has little influence compared to a four-point decoupling solution. In case of roll-over, the behaviour in the longitudinal and transverse directions is described above and the behaviour in the vertical direction results in the flexion of the blade.

The battery structure may have two first mounting portions extending from the lower corners of the first end wall along the longitudinal direction and second mounting portions extending from the lower corners of the second end wall along the longitudinal direction, the first mounting portions being fixed to the free ends of the blade, and the second mounting portions being fixed to the second bracket.

The battery may present two opposite lateral walls spaced apart from each other in the transverse direction, each of the lateral walls presenting a lateral edge extending between one of the lower corners of the first end wall and one of the lower corners of the second end wall, and the battery structure may have two longitudinal supports extending along the longitudinal direction and spaced apart from each other along the transverse direction, each of the longitudinal supports including one of the first mounting portions and one of the second mounting portions, each of the lateral edges resting on one of the longitudinal supports.

The battery structure may comprise at least one horizontal frame including the longitudinal supports and at least two traverse connection members connecting the longitudinal supports to one another.

The horizontal frame provides a crash structure on a bottom side with a longitudinal stiffness that limits overall deformation and thereby provides a high level of protection in frontal crash.

The battery structure may comprise a damping device configured to damp vertical vibrations, the damping device being interposed between the center portion of the blade and the first bracket.

The center portion of the blade and the first bracket may have respective support surfaces facing each other in a vertical direction, the damping device comprising at least one pad made of elastically deformable material in contact with the support surfaces of the center portion of the blade and the first bracket.

The battery structure may be configured to accommodate at least two batteries superimposed over each other, the battery structure comprising two resiliently deformable arrangements superimposed over each other on the first bracket, and two fixation arrangements superimposed over each other on the second bracket.

The chassis may comprise at least two beams parallel to each other along the longitudinal direction, the beams presenting respective internal surfaces facing each other and respective external surfaces opposite the internal surfaces, the battery structure being attached to the external surface of one of the beams.

The battery structure may further comprise a side crash protection member attached to ends of the first and second brackets opposite the external surface of the beam.

Such side crash protection member is configured to limit intrusion in the battery in case of side collision.

BRIEF DESCRIPTION OF DRAWINGS

Other objects and advantages of the invention will emerge from the following disclosure of a particular embodiment of the invention given as non limitative example, the disclosure being made in reference to the enclosed drawings in which.

DESCRIPTION OF EMBODIMENTS

On the Figures, the same reference numbers refer to the same or similar elements.

Figure 1:
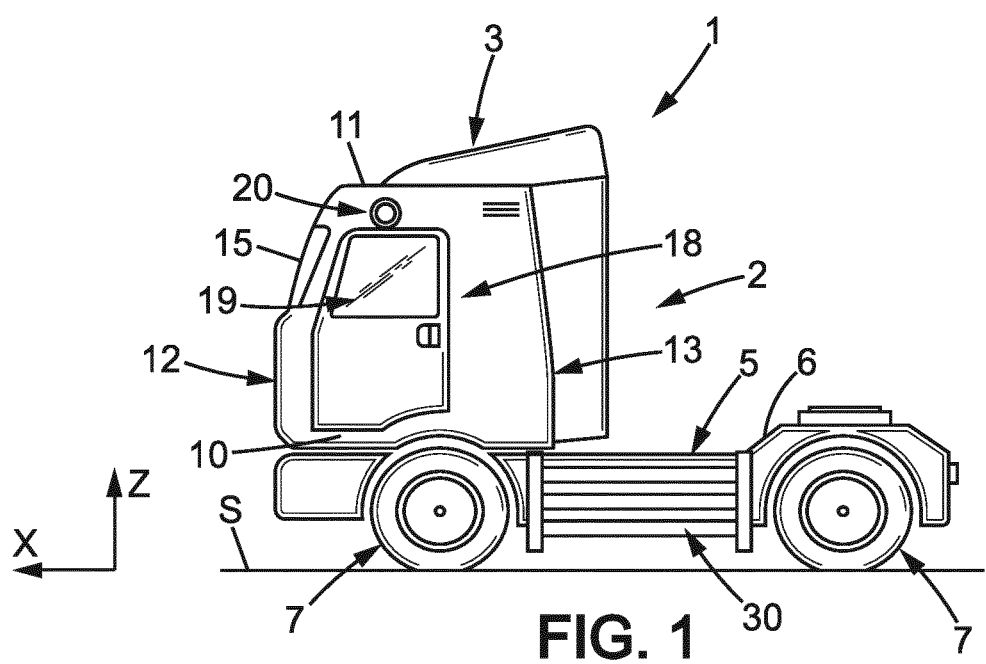
FIG. 1 is a lateral view of a commercial vehicle according to an embodiment of the invention, the commercial vehicle having a battery structure configured to accommodate batteries superimposed over each other, the battery structure comprising first and second brackets attached to an external surface of a beam of a chassis of the commercial vehicle.

FIG. 1 represents a commercial vehicle 1 according to an embodiment of the invention. In the represented embodiment, although not limited thereto, the commercial vehicle 1 is a tractor of a truck comprising a frame 2 extending along a longitudinal direction X corresponding to a direction along which the vehicle 1 moves forward or rearward on a ground surface S. The frame 2 comprises a cab 3 defining a compartment with a driving place where a driver may seat, and a chassis 5 adjoining the cab 3 in the longitudinal direction X.

The driver cab 3 comprises:
- a floor 10 and a roof 11 delimiting the compartment in a vertical direction Z perpendicular to the ground surface S and to the longitudinal direction X,
- opposite front 12 and back 13 walls delimiting the compartment 4 in the longitudinal direction X, the front wall 12 being provided with a windshield 15 on an upper part, close to the roof 11, and with a front control panel on a lower part, close to the floor 11, behind a steering wheel,
- side walls 18 delimiting the compartment in a transverse direction Y perpendicular to the longitudinal X and vertical Z directions, the side walls 18 being provided with respective driver and passenger doors 19.

The chassis 5 preferably comprises two beams 6 parallel to each other along the longitudinal direction X. The beams 6 present respective internal surfaces facing each other and respective external surfaces opposite the internal surfaces.

The cab 3 and the chassis 5 are mounted on wheels 6 driven by a motor system.

In this respect, the commercial vehicle 1 is at least partly electrically powered, such as a hybrid, plug-in hybrid or full electric commercial vehicle. The motor system then comprises an electrically powered engine and one or several batteries 21 to supply the electrically powered engine with electrical energy.

According to the invention, the commercial vehicle 1 has a battery structure 30 rigidly attached to the external surface of one of the beams 6.

Figure 2:
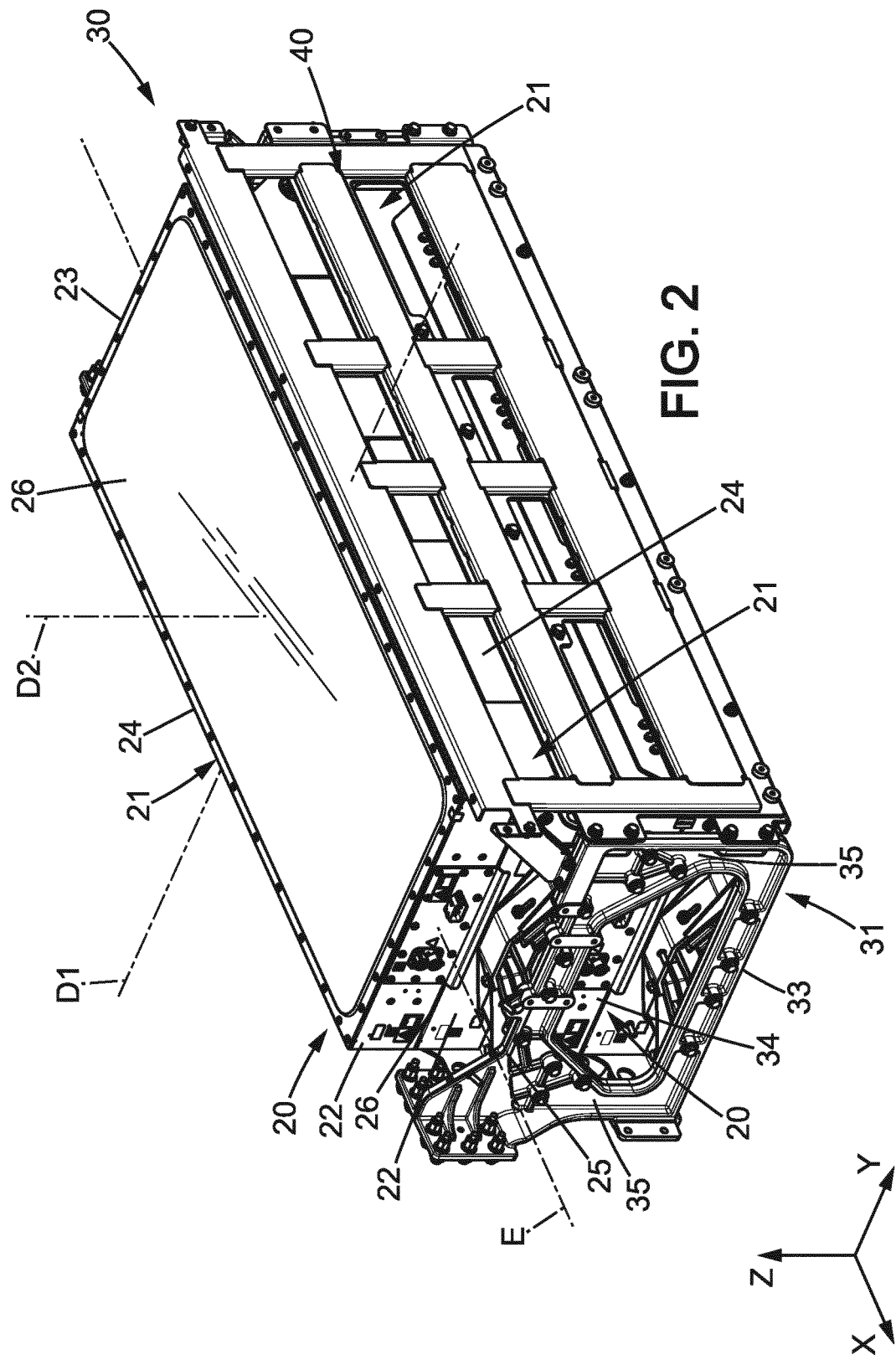
FIG. 2 is a perspective view of the battery structure of the commercial vehicle of FIG. 1, each battery being movably mounted on the first bracket through a resiliently deformable arrangement, and rigidly mounted on the second bracket through a fixation arrangement.

As shown in FIG. 2, the battery structure 30 is configured to accommodate two battery boxes 20 superimposed over each other in the vertical direction Z. Each battery box 20 includes two batteries 21 resting over one another in the vertical direction Z.

Each battery 21 has a parallelepiped shape presenting two opposite first 22 and second 23 end walls spaced apart from each other in an extension direction E, two opposite lateral walls 24 spaced apart from each other in a first direction D1 perpendicular to the extension direction E, and two opposite lower 25 and upper 26 walls spaced apart from each other in a second direction D2 perpendicular to the extension direction E and the first direction D1. The battery 21 presents four lower corners on the lower wall 25, two of them being arranged at a lower edge of the first end wall 22 and the two others being arranged at a lower edge of the second end wall 23. The two lower corners of each of the first 22 and second 23 end walls are then spaced apart from each other along the first direction E1. Besides, each of the lateral walls 24 has a lateral edge extending in the extension direction E to join one of the lower corners of the first end wall 22 and one of the lower corners of the second end wall 23.

The batteries 21 are of large dimensions, possibly up to 2 m long or more along the extension direction E between the first 22 and second 23 end walls.

The battery structure 30 comprises first 31 and second 32 brackets extending in the transverse direction Y at a distance from each other along the longitudinal direction X. In the represented embodiment, the first bracket 31 is arranged forward and the second bracket 32 is arranged rearward along the longitudinal direction X.

In the represented embodiment, each of the first 31 and second 32 brackets is conformed as a rectangular frame comprising lower 33 and upper 34 traverses extending in the transverse direction Y and spaced apart in the vertical direction Z, and two posts 35 extending in the vertical direction Z and connecting ends of the lower 33 and upper 34 traverses.

For each of the first 31 and second 32 brackets, an end of each of the lower 33 and upper 34 traverse is rigidly attached, especially bolted, to the external surface of the beam 6. The opposite ends of the lower 33 and upper 34 traverse of the first 31 and second 32 brackets are connected by a side crash protection member 40 configured to protect the batteries 21 from intrusion in case of side collision. In particular, the side crash protection member 40 is configured as a barrier comprising longitudinal bars 41 and vertical bars 42 crossing each other at right angle.

Figure 3:
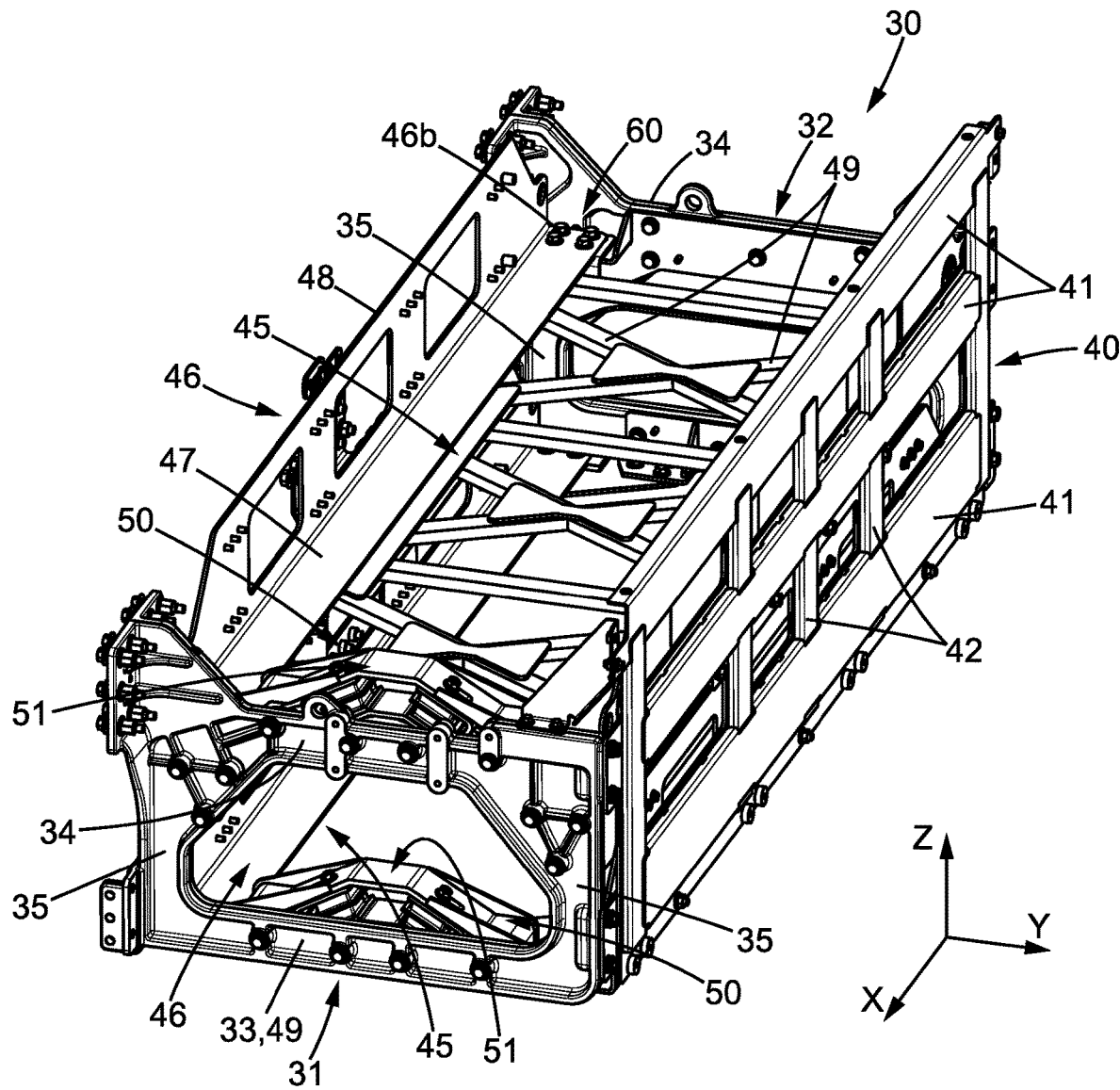
FIG. 3 is a perspective view of the battery structure of FIG. 2 seen from the first bracket.
Figure 4:
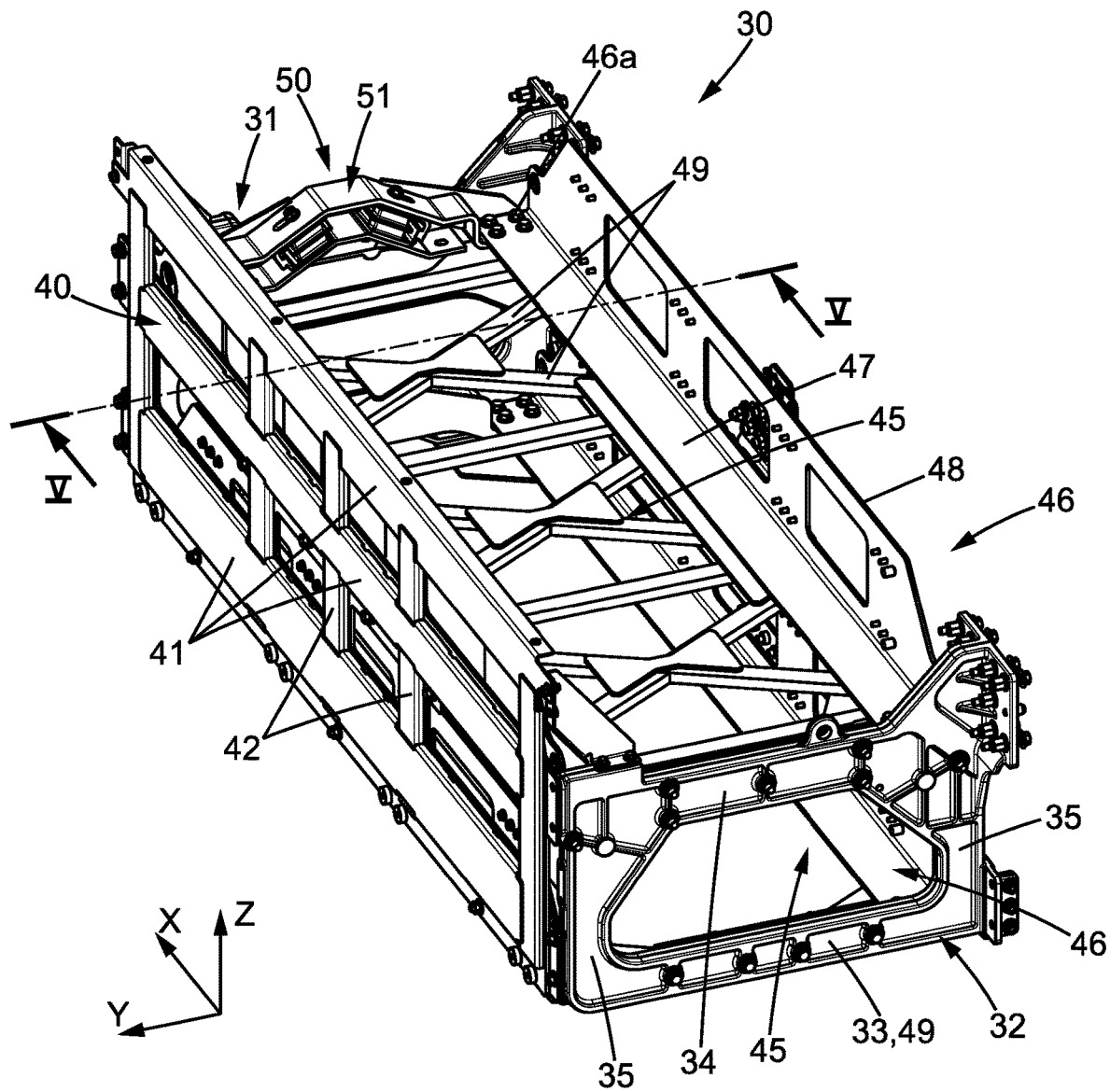
FIG. 4 is a perspective view of the battery structure of FIG. 2 seen from the second bracket.
Figure 5:
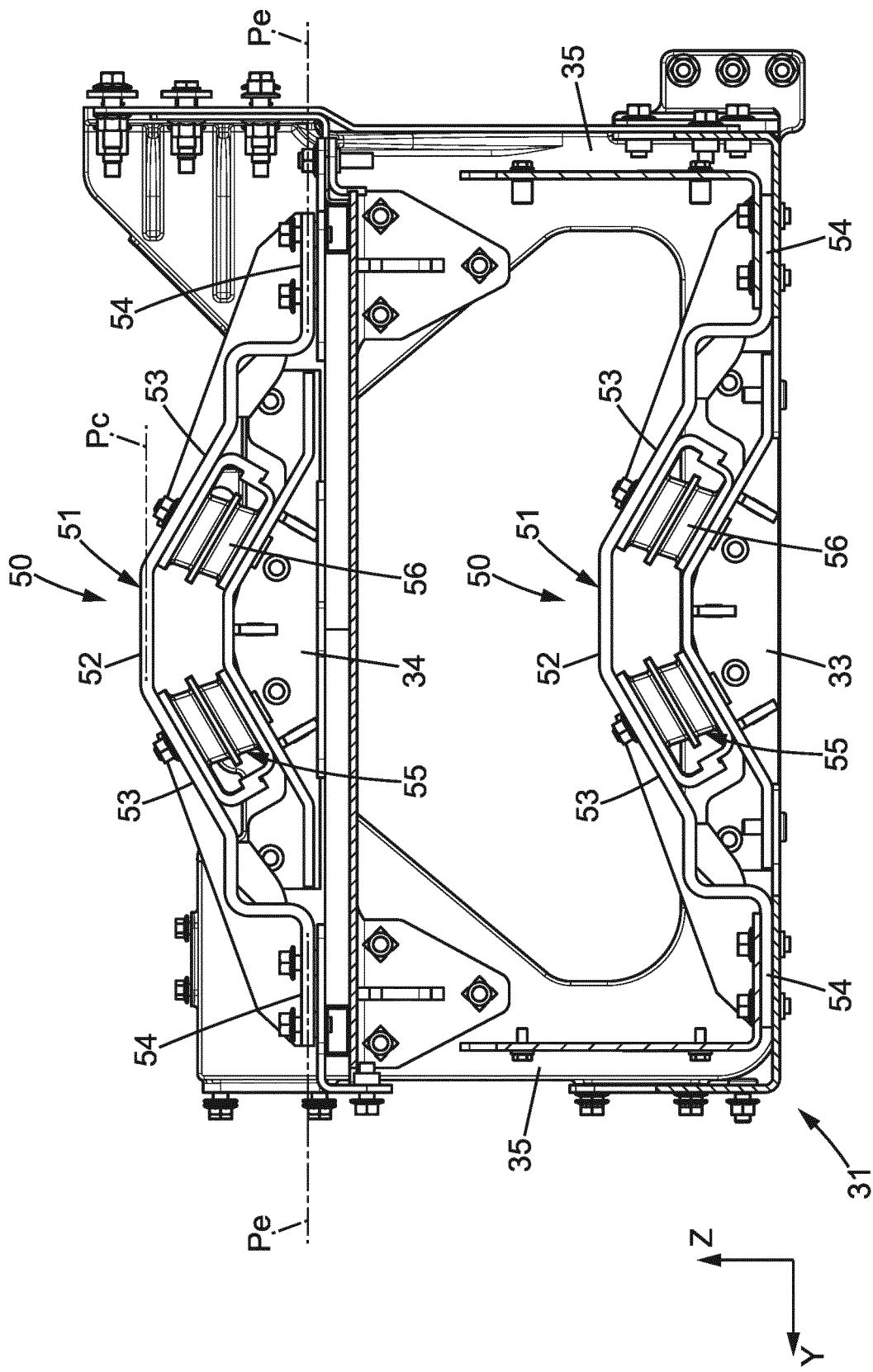
FIG. 5 is a plan view of the first bracket along the orientation referenced V-V on FIG. 4, illustrating the resiliently deformable arrangements, each resiliently deformable arrangement comprising a blade that is resiliently deformable and extends in the transverse direction, the blade having a center portion fixed to the first bracket, and opposite free ends on which the battery is mounted.

As represented in FIG. 3, the battery structure 30 also comprises lower and upper horizontal frames 45 superimposed in the vertical direction Z. Each of the lower and upper horizontal frames 45 extends in a XY plane parallel to the longitudinal X and transverse Y directions and perpendicular to the vertical direction Z. Each of the lower and upper horizontal frames 45 includes:

two longitudinal supports 46 extending along the longitudinal direction X and spaced apart from each other along the transverse direction Y, and at least two traverse connection members 49 connecting the longitudinal supports 46 to one another.

Each of the longitudinal supports 46 has a L-shaped cross-section with a horizontal portion 47 extending in a XY plane, parallel to the longitudinal X and transverse Y directions, and a lateral portion 48 extending in a XZ plane, parallel to the longitudinal X and vertical Z directions.

In the upper horizontal frame 45, the traverse connection members 49 form a truss of bars crossing each other. In the lower horizontal frame 45, the traverse connection members 49 are formed by the lower traverses 33 of the first 31 and second 32 brackets.

The battery structure 30 comprises resiliently deformable arrangements 50 on each of the lower 33 and upper 34 traverses of the first bracket 31, and fixation arrangements 60 on each of the lower 33 and upper 34 traverses of the second bracket 32. Two resiliently deformable arrangements 50 are then superimposed over each other on the first bracket 31 in the vertical direction Z, and two fixation arrangements 60 superimposed over each other on the second bracket 32 in the vertical direction Z.

Each resiliently deformable arrangement 50 comprises a blade 51 that is resiliently deformable and extends in the transverse direction Y. The blade 51, preferably made of steel, has a center portion and opposite free ends 54 on either sides of the center portion. The blade 51 is conformed so that the free ends 54 of the blade 51 extend in a horizontal end plane Pe that is offset with respect to a horizontal central plane Pc including the center portion. The horizontal end plane Pe may be offset towards the ground surface S with respect to the horizontal central plane Pc. The center portion comprises a horizontal area 52 connected to the free ends 54 by inclined connecting areas 53 diverging from each other.

The center portion of the blade 51 is fixed to the first bracket 31 through a damping device 55 configured to damp vertical vibrations. Each of the lower 33 and upper 34 traverses is equipped with support surfaces arranged to face in the vertical direction Z corresponding support surfaces on the inclined connecting areas 53 of the center portion of the blade 51. The damping device 55 comprises one or several pads 56 made of elastically deformable material interposed between the center portion of the blade 51 and one of the lower 33 and upper 34 traverses of the first bracket 31. In particular, in each damping device 55, one pad 56 is in contact with the support surfaces of the inclined connecting areas 53 of the center portion of the blade 51 and the first bracket 31.

The fixation arrangements 60 are formed by horizontal support surfaces extending from the lower 33 and upper 34 traverses of the second bracket 32.

Each of the longitudinal supports 46 of the lower and upper horizontal frames 45 has one end configured as a first mounting portion 46a fixed to one of the free ends 54 of one of the blades 51 of the first bracket 31, and an opposite end configured as a second mounting portion 46b fixed to one of the support surfaces of the second bracket 32.

The batteries 21 are installed horizontally in the battery structure 30 so that the extension direction E is parallel to the longitudinal direction X, the first direction D1 is parallel to the transverse direction Y and the second direction D2 is parallel to the vertical direction Z. In particular, the batteries 21 are laid on the lower and upper horizontal frames 45 with the lateral edges resting on the longitudinal supports 46. The lower corners of the first end wall 22 of each battery 21 are mounted on the free ends 54 of one of the blades 51 through the first mounting portions 46a of the corresponding longitudinal support 46 which extend from these lower corners along the longitudinal direction X. The lower corners of the second end wall 23 are mounted on the support surfaces of the second bracket 32 through the second mounting portions 46b of the corresponding longitudinal support 46 which extend from these lower corners along the longitudinal direction X. The battery 21 is then mounted in a movable manner on the first bracket 31 while being mounted in a rigid manner on the second bracket 32, thereby providing a torsion decoupling effect between the chassis 5 and the battery 21 while ensuring sufficient stiffness and strength to withstand strains in case of crash.

Figure 6:
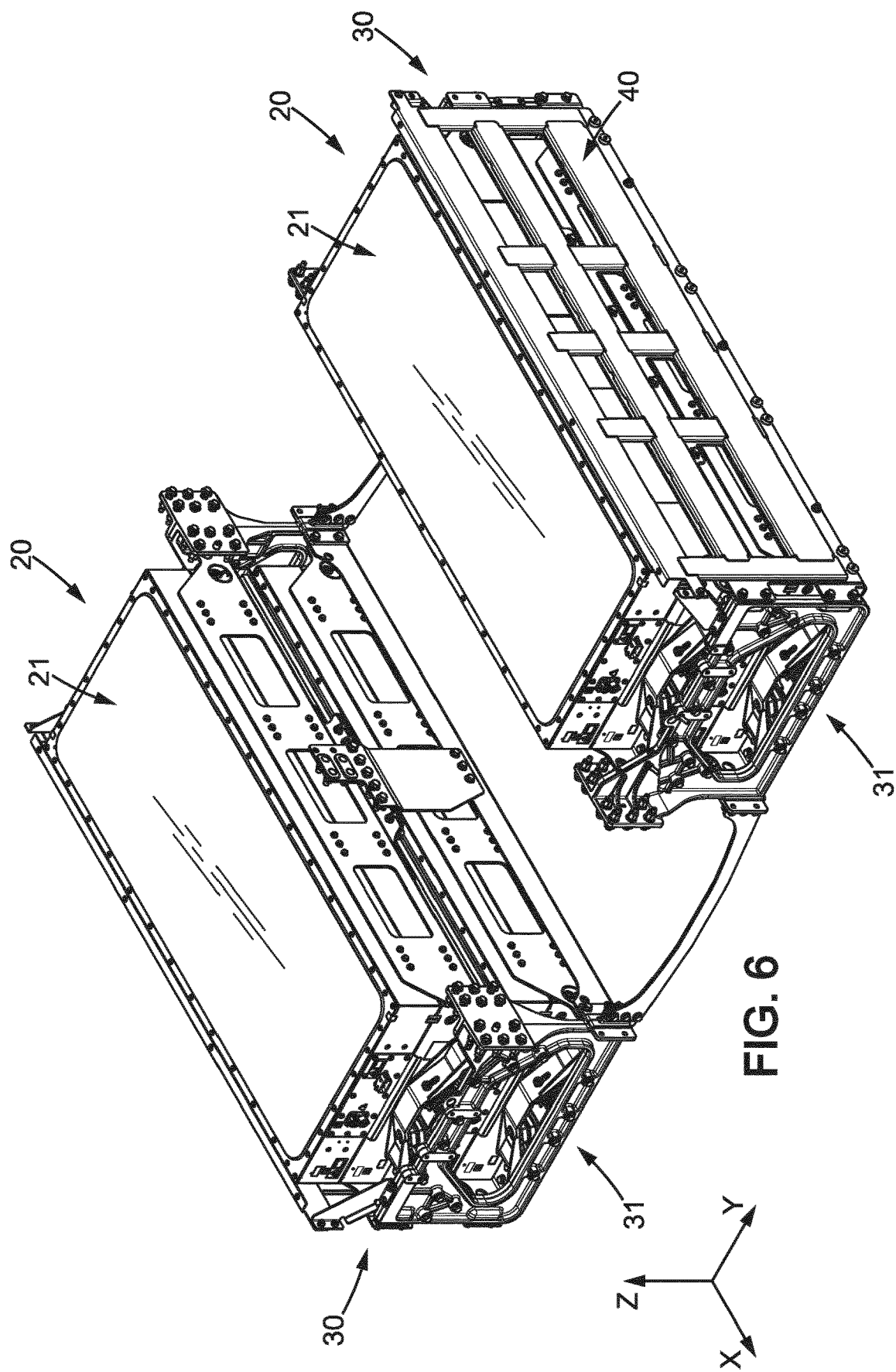
FIG. 6 is a perspective view of two battery structures intended to be attached to the external surfaces of two parallel beams of the chassis of the commercial vehicle.

As shown in FIG. 6, two similar battery structures 30 can be arranged on the external surfaces of both beams 6 of the chassis 5.

The invention is not limited to the disclosed embodiment. In other embodiments, the first bracket 31 with the resiliently deformable arrangements 50 could be arranged rearward and the second bracket 32 with the fixation arrangement 60 could be arranged forward. The first 31 and second 32 brackets could comprise only one traverse or more than two traverses superimposed in the vertical direction Z, each traverse comprising one arrangement chosen between the resiliently deformable arrangement 50 and the fixation arrangement 60. Accordingly, the battery structure 30 could comprise one or more than two horizontal frames 45.

The invention claimed is:

1. A commercial vehicle comprising:
a cab with a driving place for a driver,
a chassis adjoining the cab along a longitudinal direction,
an electrically powered engine, and
at least one battery to supply the electrically powered engine with electrical energy, the commercial vehicle being at least partly electrically powered,
at least one battery structure rigidly attached to the chassis to accommodate the battery, the battery structure comprising:
first and second brackets extending in a transverse direction at a distance from each other along the longitudinal direction,
at least one resiliently deformable arrangement through which the battery is mounted on the first bracket, and
at least one fixation arrangement through which the battery is rigidly mounted on the second bracket,
wherein the resiliently deformable arrangement comprises a blade that is resiliently deformable and extends in the transverse direction, the blade having a center portion fixed to the first bracket, and opposite free ends on which the battery is mounted.

2. The commercial vehicle of claim 1, wherein the blade is conformed so that the free ends of the blade extend in a horizontal end plane that is offset with respect to a horizontal central plane including the center portion.

3. The commercial vehicle of claim 2, wherein the horizontal end plane is offset towards a ground surface on which the commercial vehicle rests with respect to the horizontal central plane.

4. The commercial vehicle of claim 1, wherein the battery has a parallelepiped shape presenting two opposite first and second end walls spaced apart from each other in the longitudinal direction, each of the first and second end walls presenting two lower corners spaced apart from each other in the transverse direction, and wherein the lower corners of the first end wall are mounted on the free ends of the blade, and the lower corners of the second end wall are mounted on the second bracket.

5. The commercial vehicle of claim 4, wherein the battery structure has two first mounting portions extending from the lower corners of the first end wall along the longitudinal direction and second mounting portions extending from the lower corners of the second end wall along the longitudinal direction, the first mounting portions being fixed to the free ends of the blade, and the second mounting portions being fixed to the second bracket.

6. The commercial vehicle of claim 5, wherein the battery presents two opposite lateral walls spaced apart from each other in the transverse direction, each of the lateral walls presenting a lateral edge extending between one of the lower corners of the first end wall and one of the lower corners of the second end wall, and wherein the battery structure has two longitudinal supports extending along the longitudinal direction and spaced apart from each other along the transverse direction, each of the longitudinal supports including one of the first mounting portions and one of the second mounting portions, each of the lateral edges resting on one of the longitudinal supports.

7. The commercial vehicle of claim 6, wherein the battery structure comprises at least one horizontal frame including the longitudinal supports and at least two traverse connection members connecting the longitudinal supports to one another.

8. The commercial vehicle of claim 1, wherein the battery structure comprises a damping device configured to damp vertical vibrations, the damping device being interposed between the center portion of the blade and the first bracket.

9. The commercial vehicle of claim 8, wherein the center portion of the blade and the first bracket have respective support surfaces facing each other in a vertical direction, the damping device comprising at least one pad made of elastically deformable material in contact with the support surfaces of the center portion of the blade and the first bracket.

10. The commercial vehicle of claim 1, wherein the battery structure is configured to accommodate at least two batteries superimposed over each other, the battery structure comprising two resiliently deformable arrangements superimposed over each other on the first bracket, and two fixation arrangements superimposed over each other on the second bracket.

11. The commercial vehicle of claim 1, wherein the chassis comprises at least two beams parallel to each other along the longitudinal direction, the beams presenting respective internal surfaces facing each other and respective external surfaces opposite the internal surfaces, the battery structure being attached to the external surface of one of the beams.

12. The commercial vehicle of claim 11, wherein the battery structure further comprises a side crash protection member attached to ends of the first and second brackets opposite the external surface of the beam.

13. A commercial vehicle comprising:
a cab with a driving place for a driver,
a chassis adjoining the cab along a longitudinal direction,
an electrically powered engine,
at least one battery to supply the electrically powered engine with electrical energy, the commercial vehicle being at least partly electrically powered, and
at least one battery structure rigidly attached to the chassis to accommodate the battery, the battery structure comprising:
first and second brackets extending in a transverse direction at a distance from each other along the longitudinal direction,
at least one resiliently deformable arrangement through which the battery is mounted on the first bracket, and
at least one fixation arrangement through which the battery is rigidly mounted on the second bracket,
wherein the chassis comprises at least two beams parallel to each other along the longitudinal direction, the beams presenting respective internal surfaces facing each other and respective external surfaces opposite the internal surfaces, the battery structure being attached to the external surface of one of the beams.

\* \* \* \* \*